Figure 1:
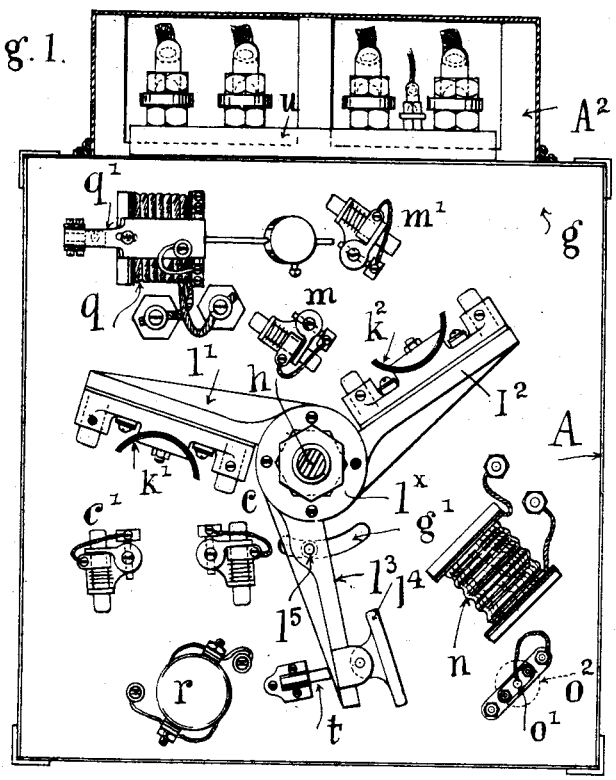

No. 873,139. PATENTED DEC. 10, 1907.
A. TAYLOR, T. EATON & H. SCHWARZ.
APPARATUS FOR USE IN STARTING AND CONTROLLING ELECTRIC MOTORS.
APPLICATION FILED JULY 23, 1907.

4 SHEETS—SHEET 1.

WITNESSES.
M. Petit
Geo. J. Sweeney

INVENTORS.
Abraham Taylor,
Thomas Eaton, &
Herman Schwarz.
By their Attorney

No. 873,139. PATENTED DEC. 10, 1907.
A. TAYLOR, T. EATON & H. SCHWARZ.
APPARATUS FOR USE IN STARTING AND CONTROLLING ELECTRIC MOTORS.
APPLICATION FILED JULY 23, 1907.
4 SHEETS—SHEET 2.
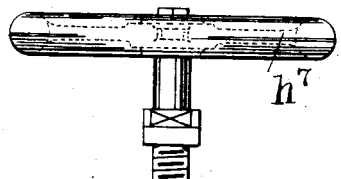
Fig. 4.
Fig. 5.
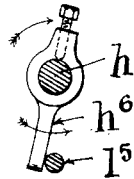
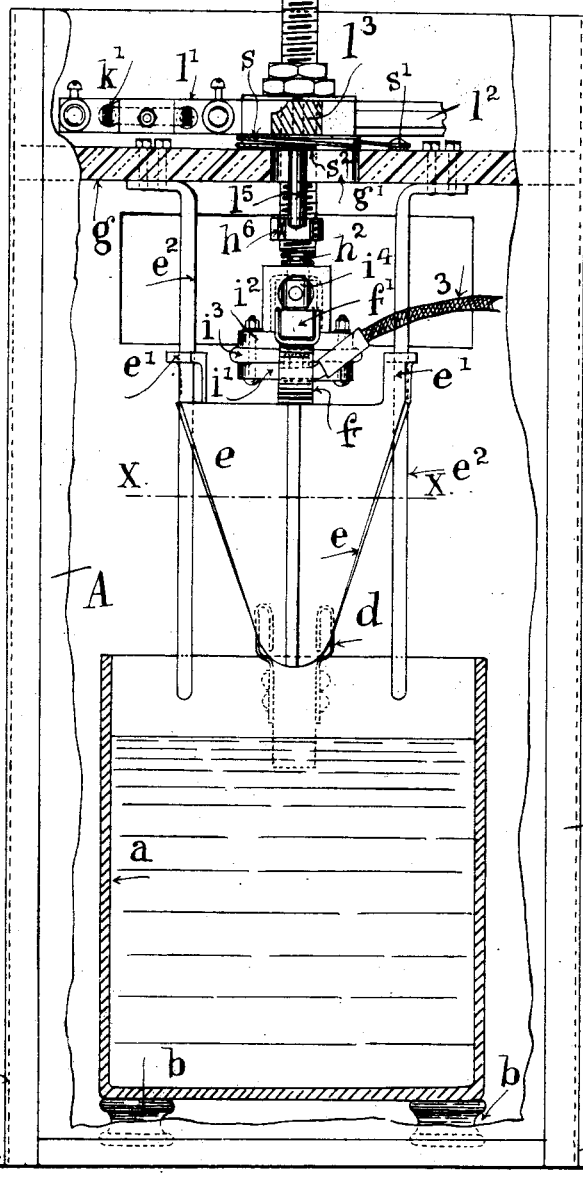
Fig. 6
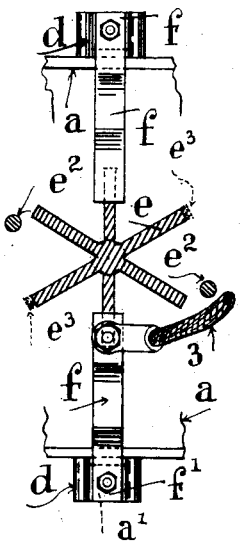
WITNESSES
INVENTORS.
Abraham Taylor,
Thomas Eaton, &
Herman Schwarz.
By their Attorney No. 873,139. PATENTED DEC. 10, 1907.
A. TAYLOR, T. EATON & H. SCHWARZ.
APPARATUS FOR USE IN STARTING AND CONTROLLING ELECTRIC MOTORS.
APPLICATION FILED JULY 23, 1907.
4 SHEETS—SHEET 3.
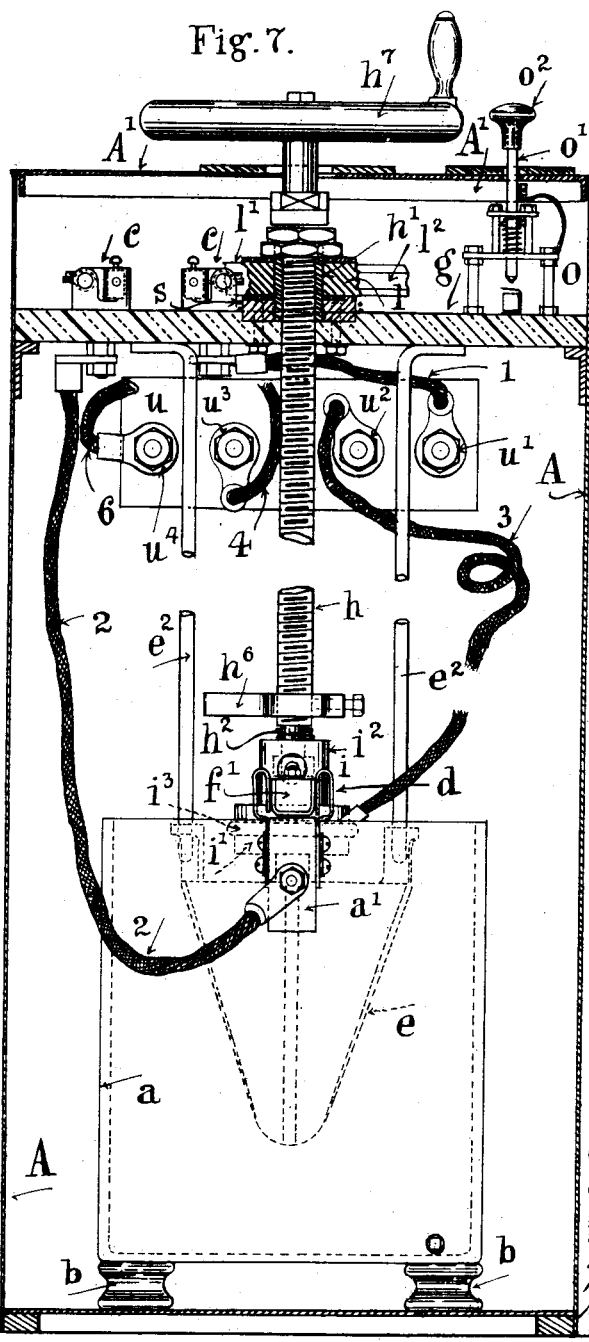
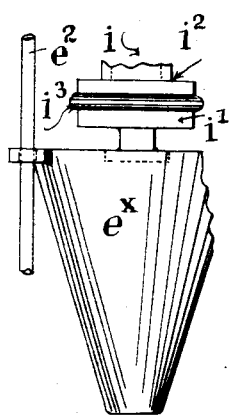

No. 873,139.  
PATENTED DEC. 10, 1907.  
A. TAYLOR, T. EATON & H. SCHWARZ.  
APPARATUS FOR USE IN STARTING AND CONTROLLING ELECTRIC MOTORS.  
APPLICATION FILED JULY 23, 1907.

4 SHEETS—SHEET 4.

WITNESSES.  
INVENTORS  
Abraham Taylor,  
Thomas Eaton, &  
Herman Schwarz.  
By their Attorney

UNITED STATES PATENT OFFICE.

ABRAHAM TAYLOR, OF RISHTON, AND THOMAS EATON AND HERMAN SCHWARZ, OF MANCHESTER, ENGLAND.

APPARATUS FOR USE IN STARTING AND CONTROLLING ELECTRIC MOTORS.

No. 873,139.   Specification of Letters Patent.   Patented Dec. 10, 1907.

Application filed July 23, 1907. Serial No. 385,106.

*To all whom it may concern:*

Be it known that ABRAHAM TAYLOR and THOMAS EATON, subjects of Great Britain, and HERMAN SCHWARZ, a subject of Germany, residing, respectively, at 74 Hermitage street, Rishton, in the county of Lancaster, England, electrician, 19 Eldon street, Manchester, in the aforesaid county, hydraulic engineer, and 53 Hyde Grove, Chorlton-on-Medlock, Manchester aforesaid, furrier, have invented new and useful Improvements in Apparatus for Use in Starting and Controlling Electric Motors, of which the following is a specification.

Our said invention relates to motor starters or starting devices for use in connection with electric motors.

At the present time it is usual to employ a starter and a single or double pole switch mounted on a wall and quite independent of the starter.

According to our invention we propose to use an entirely self-contained starter and double pole switch combined and inclosed therewith, which double pole switch is interlocked with the starting resistance. Our self-contained appliance is so constructed that it is not possible to throw-on the current to the motor otherwise than gradually, while the current may be cut-off instantaneously. The switch once released, to again operate the same and throw-on the current it is necessary under our invention to raise the water or other contact making device into such a position that it can interlock with the combined switch and accomplish the resetting after which the contact device can only be gradually put back to full working position to cut out the whole of the resistance.

The drawings show the invention.

Figure 2:
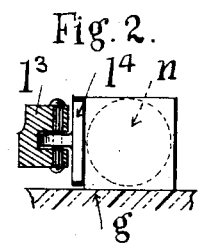
Figure 3:
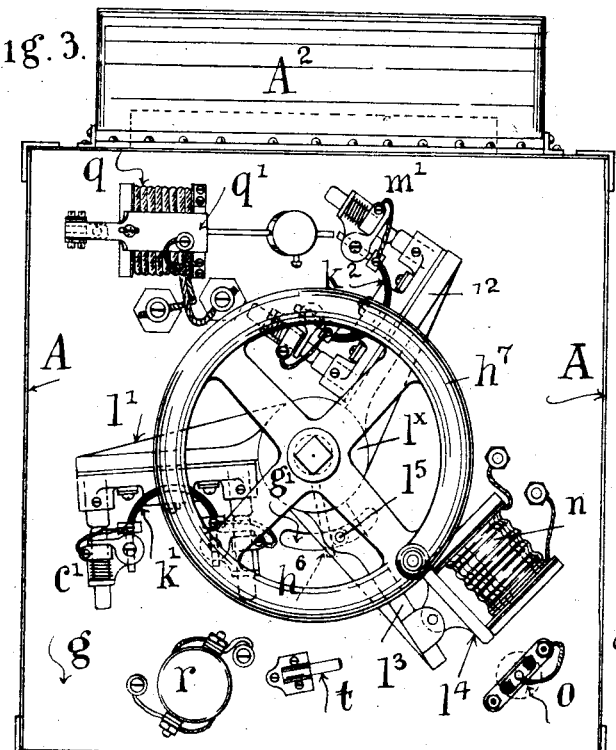
Figure 9:
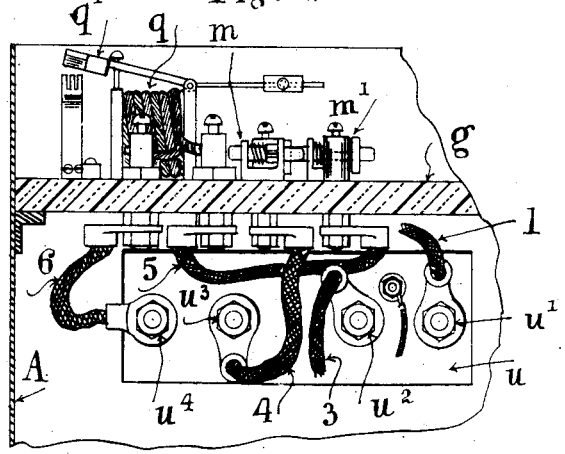
Figure 10:
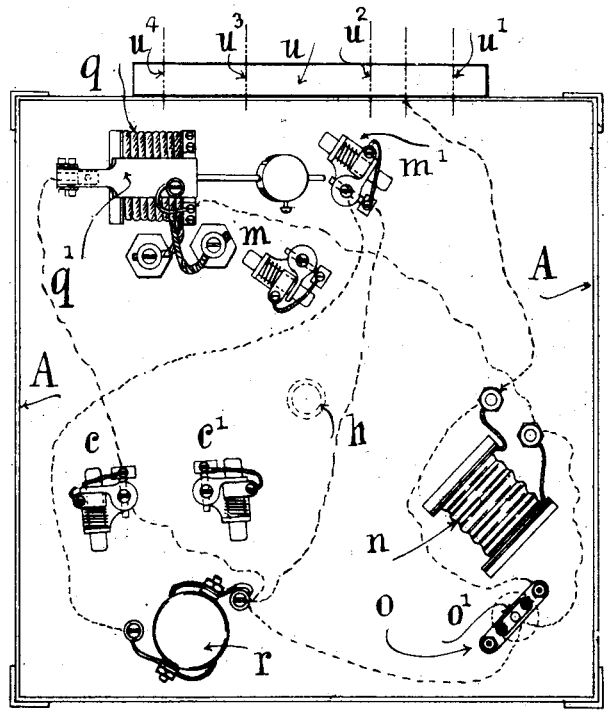

In the said drawings:—Figure 1 shows a plan view partly in section of our self-contained motor-starter with combined switch with the cover or lid removed, the switch being shown in the "off" position. Fig. 2 is a detail view of the armature which is carried by one arm of the switch, see Fig. 1. Fig. 3 is a plan view somewhat similar to Fig. 1 but with the switch "on." Fig. 4 is an elevation partly in section of the self-contained motor-starter with the cone or contact device elevated, and shows one arm of the double pole switch together with other details. Fig. 5 is a detail section indicating the operative finger for closing the combined and inclosed switch. Fig. 6 shows a detail section on the line X—X Fig. 3 of the bladed cone seen in that figure. Fig. 7 is an elevation also partly in section of the self-contained motor-starter, but in this case the cone is shown immersed. The figure also shows two contact or pole pieces with which one arm of the switch contacts when the switch is "on." Fig. 8 shows a plain cone which may be used instead of the bladed cone shown in Figs. 4 and 6. Fig. 9 is a detail sectional view showing the other two contact or pole pieces in side view, the overload release coil, and the cables and insulated support. Fig. 10 is a plan view of the double contacts, overload release coil, noninductive coil, no voltage release coil, and cut-out device &c.

In the wet self-contained motor starter shown, we use a casing or receptacle A made of sheet metal plates secured together, or built-up in convenient fashion, and which is designed to contain practically the whole of the working parts. Within this casing or receptacle A is a cast-iron or other vessel $a$ containing a liquid and which vessel is insulated by standing on porcelain insulators $b$, or otherwise. This vessel $a$ is connected with the source of supply from which the current is derived, as for instance, the current may come in by the main or cable $l$ attached at $u'$ on the insulated support $u$, and pass to a contact $c$ which is one of a pair $c$, $c'$, the two being bridged or connected when current is passing through to the motors by a switch to be described later. The contacts $c$ and $c'$ are secured to an insulated support $g$, and contact $c'$ is connected to the tank $a$ (or a block $a'$ thereon) through a cable 2. Upon the tank we mount short-circuiting contacts $d$ which may be bent copper strips as shown.

Working in conjunction with the contacts $d$ of the vessel $a$ we use a contact device capable of being lowered and raised. In the drawing the contact device is a six bladed cone $e$ which carries arms or parts $f$ attached thereto, the extremities of which arms are lettered $f'$ and are copper shod and are capable of engaging the contacts $d$ on the vessel $a$ when the cone is sufficiently lowered. The bladed cone may have copper facings $e^3$ mounted upon its blades see Fig. 6. Such cone $e$ is so carried as to be capable of being gradually lowered or raised as explained and is accurately guided in manner to prevent rotation, as for example the cone may have ears $e'$ bored to engage spindles $e^2$ $e^2$ bolted to the insulated support $g$, see Fig. 4. Any other equally simple way of guiding the cone may be used, and instead of a bladed cone we may utilize a plain cone $e^\times$ (see Fig. 8).

To lower and raise the cone we suspend same upon a quick threaded screwed spindle $h$. This spindle $h$ engages a screwed bush $h'$ firmly secured to the insulated support $g$, while its lower extremity is reduced or formed with a neck $h^2$. This neck passes through a bored aperture in the connecting block $i$ which consists of two halves, the one half $i'$ being secured to the cone $e$ and the other half $i^2$ bolted to this, a layer of insulating material $i^3$ being interposed between the two. The neck $h^2$ passes into a chamber or recess in the half $i^2$ and a sleeve or nut $i^4$ pinned in position serves to connect the entire block $i$ to the spindle in a way which permits the spindle to turn freely in the block, so that the cone can be lowered without its rotating.

The insulated support $g$ carries about its upper face, a double pole switch and the center of movement of this switch is about the screwed spindle $h$. The switch shown, has three arms all connected to a common boss $l^\times$, moving around the screwed bush $h'$, the arm $l'$ carrying or forming one pole and the arm $l^2$ the other pole, while the third arm $l^3$ carries a pivoted armature $l^4$ and is also designed to be acted on to effect the setting of the switch as will soon be described. Upon the arms $l'$ $l^2$ the contacts are carried and each of such may comprise carbon pieces in an insulated cast-iron carrier and laminated brushes $k'$ $k^2$ as shown, which, when the switch is set on, bridge the contacts $c$ $c'$ and the other set $m$, $m'$. The contacts $c$ $c'$ and $m$ $m'$ carry spring pressed carbon pieces, as the drawings indicate, and adjustable blocks for the laminated brushes $k'$ $k^2$ to contact with.

The switch arm $l^3$ has a pin $l^5$ projecting downwards through the slot $g'$, and to act on said pin $l^5$, and so move and set the switch we attach to the spindle $h$ a finger $h^6$ adjustable thereon. When the spindle $h$ is fully raised by an anti-clockwise movement of the handwheel $h^7$, it acts on the pin $l^5$ and so the switch is moved and the armature $l^4$ held. To hold the switch in action we use one or more no-voltage release coils, one such coil being shown in the drawing and marked $n$, and this coil is energized in suitable manner as for instance by the shunt from the motors, or by current derived in any other convenient way. In connection with this coil is a cut-out device $o$ of any convenient description. The one shown has a spindle $o'$ passing outside the starter casing and an operating handle $o^2$. By pressing on such handle the current can be short circuited and the coil $n$ cut out and consequently the switch released as will be obvious. Likewise we use an overload release coil of any suitable kind such as that marked $q$, which when the current flowing round the coil exceeds that desired the armature $q'$ is attracted and makes contact with the stud thereby short circuiting the no voltage release coil $n$ with the result that the switch arm is automatically released to the off position. A non-induction coil $r$ is also fitted of any suitable known kind.

The switch arm $l^3$ is moved into contact with the coil $n$ against the action of a spring or weight, as for instance against the action of a coiled spring $s$ having one end anchored at $s'$ and the other end $s^2$ secured to the finger $l^5$, while a buffer $t$ is fitted to cushion the switch-lever arm $l^3$ and prevent re-bound. The switch, coils, buffer, and spindle bearing &c., are all located on the support $g$, and also the wire connections for the coils &c. so that all are within the walls of the receptacle or casing A. The latter is provided with a lid or cover A' through which only the screw-threaded spindle $h$ with its wheel $h'$ and the cut-out device handle $o^2$ project.

We have traced the current into the starter to the tank $a$, from which it obviously passes out to the motor. It does this either directly through the contacts $d$ or through the cone $e$, according to the position of the latter, a cable 3 being attached to the arm $f$ and leading to the insulated cable support $u$ and attached at $u^2$. From $u^2$ the current flows to the motors, reëntering at $u^3$ from which a cable 4 leads to the contact device $m$, the switch arm $l^2$ with brush $k^2$ bridging $m$ $m'$. From contact $m'$ a cable 5 leads to the over-load release coil $q$, while from the over-load release coil $q$ a cable 6 attached at $u^4$ provides for the return.

In starting-up motors with our self-contained apparatus the operator turns the hand-wheel $h^7$ in a left-hand direction causing the finger $h^6$ to engage the projection $l^5$ pendent from the switch arm $l^3$ by which the latter is moved and the armature $l^4$ advanced to the coil $n$ against the action of the spring $s$. The operator, having set the switch now turns the spindle in the opposite or right-hand direction and gradually lowers the cone into the liquid in the tank $a$, thus gradually setting-on the current, the cone being lowered until the extremities $f'$ of the arms $f$ rest in the short-circuiting contacts $d$ whereupon the liquid is cut-out and the current passes direct through the contacts and up the cable 3. Should it be desired to cut-off the current, and so stop the motor the handle $o^3$ of the cut-out device is pressed down and this action short circuits the no voltage release coil $n$ which then becomes de-magnetized and the switch automatically returns to the off position. It is seen that it is impossible for the motor to be carelessly started now, or at any time after manual or automatic release of the switch, to the "off" position, because the cone is immersed, and before the switch can be re-set, the cone must be raised to allow of the switch being moved, and when so moved, the cone must be again gradually lowered to pass the current through the starter. The whole of the mechanism being entirely inclosed the starter forms a self-contained apparatus which cannot be carelessly used. We regard the use of an inclosed switch interlocked with the resistance and operated by means which make it imperative to raise the contact device from the liquid as important it being impossible to close the double pole switch without first manually raising the cone.

The exterior cables are attached at the back of the insulating support $u$ as shown in Figs. 1 and 10 and the connections are shrouded by a casing $A^2$ forming part of or attached to the main casing $A$.

The disposition and form of the coils shown mounted on the top of the insulating support $g$ may vary.

The apparatus may be fitted with a switch and gear for reversing rotation of the motor or motors if desired this however forming no part of our invention.

We declare that what we claim is.

1. A self-contained liquid motor starter, having a combined and inclosed switch, an inclosed resistance, a contact device, means for elevating said contact device, interlocking means for closing said switch operable only when the contact device is elevated, means for holding said switch when closed, and means for lowering said contact device to cut out the resistance, substantially as described.

2. A self-contained motor starter, having a double-pole switch inclosed and interlocked with a resistance, a movable contact device in connection with the resistance, means for raising and lowering said movable contact device, means for interlocking with the switch when the movable contact is elevated to set the switch, means for holding the switch when set, and contacts for the double-pole switch, substantially as described.

3. A self-contained liquid motor starter having an inclosed and combined double-pole switch, a liquid resistance, a movable contact device, means for raising and lowering same, an interlocking connection between said raising and lowering means and the switch allowing the switch to be closed when the contact device is elevated, means for holding such switch, a fixed support and contacts thereon for the double pole switch when closed, substantially as described.

4. In combination in a liquid motor starter, a resistance, a contact device, a screwed spindle, an inclosed switch centered about said spindle, and means in connection with the screwed spindle for actuating the switch to close same operable only when the contact device is elevated, as herein set forth.

5. A motor starter having a liquid resistance, and comprising a tank, a contact device, means for raising and lowering same, an inclosed switch, means for engaging and closing the switch when the contact device is elevated, contacts for the switch, an inclosed support for such contacts, means for holding the switch when set, and short circuiting contacts in connection with the tank, and operable means for actuating the raising and lowering appliance as herein set forth.

6. In liquid motor starters and in combination, a tank, short circuiting contacts thereon, a contact device, means for guiding same, a screw threaded spindle, a finger thereon, an inclosed double-pole switch, a pendent finger thereon coöperating with the finger on the screw-threaded spindle, and means for actuating the screwed spindle to raise and lower the contact device for the purposes and as set forth.

7. In combination in liquid motor starters, an inclosed tank, short circuiting contacts thereon, a cone, means for guiding said cone, a quick threaded spindle, and an insulated connection between said spindle and cone, a combined and inclosed double-pole switch, means for setting said switch when the cone is elevated, a coil for holding said switch when closed, contacts for the double pole switch and a support for same, substantially as described.

8. The self-contained liquid motor starter having an inclosed and combined switch centered about a screwed spindle, a screwed spindle, a contact cone thereon, an inclosed tank, means in connection with said spindle coöperating with the inclosed switch to close same when required, an insulated support, contacts thereon for the switch, and coils mounted thereon, for the purposes, and substantially as described and shown.

9. In combination in a motor starter, a tank $a$, short circuiting contacts thereon, a cone $e$, guiding means for said cone, a screwed spindle, a finger $h^6$, a fixed nut for said spindle, an operating hand-wheel, an inclosed double-pole switch, a finger $l^5$ thereon, an armature $l^4$, a coil $n$, a support $g$, contacts $c\ c'$ and $m\ m'$, and coils on said support, and an inclosing casing A, all, in the manner, for the purposes, and substantially as herein set forth.

In testimony whereof we have signed our names to this specification in the presence of two subscribing witnesses.

ABRAHAM TAYLOR.
    THOMAS EATON.
    HERMAN SCHWARZ.

Witnesses:
    JOSHUA ENTWISLE,
    ALFRED YATES.